(12) United States Patent
Kamran et al.

(10) Patent No.: US 11,079,957 B2
(45) Date of Patent: Aug. 3, 2021

(54) STORAGE SYSTEM CAPACITY EXPANSION USING MIXED-CAPACITY STORAGE DEVICES

(71) Applicant: Dell Products L.P., Round Rock, TX (US)

(72) Inventors: Lior Kamran, Rishon LeZion (IL); Vladimir Shveidel, Pardes-Hana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/671,824

(22) Filed: Nov. 1, 2019

(65) Prior Publication Data

US 2021/0132839 A1    May 6, 2021

(51) Int. Cl.
*G06F 3/06* (2006.01)

(52) U.S. Cl.
CPC .......... *G06F 3/0644* (2013.01); *G06F 3/0604* (2013.01); *G06F 3/0688* (2013.01)

(58) Field of Classification Search
CPC ..... G06F 3/0688; G06F 3/0644; G06F 3/0604
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |
| 9,716,754 B2 | 7/2017 | Swift |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Edward J Dudek, Jr.
(74) *Attorney, Agent, or Firm* — Ryan, Mason & Lewis, LLP

(57) ABSTRACT

A storage system comprises a plurality of storage devices, with the storage devices comprising a first set of storage devices each having a first capacity and a second set of storage devices each having a second capacity higher than the first capacity. The storage system is further configured to establish an extended redundant array of independent disks (RAID) group to extend existing RAID stripes of the storage devices of the first set into the storage devices of the second set, and to establish an additional RAID group for the storage devices of the second set, the additional RAID group comprising one or more additional RAID stripes for the storage devices of the second set. The storage devices of the second set are illustratively added to the storage system to expand its capacity beyond that provided by the storage devices of the first set. Other embodiments include methods and computer program products.

20 Claims, 7 Drawing Sheets

(56) References Cited

U.S. PATENT DOCUMENTS

| | | | |
|---|---|---|---|
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 2005/0063217 | A1* | 3/2005 | Shiraishi ............ G06F 11/1096 365/154 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2019/0303490 | A1 | 10/2019 | Chen et al. |
| 2019/0317682 | A1* | 10/2019 | Li ........................ G06F 3/0632 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—a Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—a Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121 filed in the name of David Meiri et al. on Oct. 25, 2017 and entitled "Opportunistic Compression of Replicated Data in a Content Addressable Storage System."

U.S. Appl. No. 15/819,666 filed in the name of Xiangping Chen et al. on Nov. 21, 2017 and entitled "Storage System Configured for Controlled Transition between Asynchronous and Synchronous Replication Modes."

U.S. Appl. No. 15/824,536 filed in the name of Christopher Sayles et al. on Nov. 28, 2017 and entitled "Storage System with Asynchronous Messaging between Processing Modules for Data Replication."

U.S. Appl. No. 16/037,050 filed in the name of Ying Hu et al. on Jul. 17, 2018 and entitled "Storage System with Multiple Write Journals Supporting Synchronous Replication Failure Recovery."

U.S. Appl. No. 16/253,793 filed in the name of Yuval Harduf et al. on Jan. 22, 2019 and entitled "Storage System with Data Consistency Checking in Synchronous Replication Using Active Snapshot Set."

U.S. Appl. No. 16/396,897 filed in the name of Anton Kucherov et al. on Apr. 29, 2019 and entitled "Storage System with Deduplication-Aware Replication Implemented Using a Standard Storage Command Protocol."

U.S. Appl. No. 16/413,050 filed in the name of Xiangping Chen et al. on May 15, 2019 and entitled "Storage System with Coordinated Recovery across Multiple Input-Output Journals of Different Types."

U.S. Appl. No. 16/265,131 filed in the name of Lior Kamran et al. on Feb. 1, 2019 and entitled "Storage System with Write Cache Release Protection."

U.S. Appl. No. 15/793,147 filed in the name of Ernesto Blanco et al. on Oct. 25, 2017 and entitled "Compression Signaling for Replication Process in a Content Addressable Storage."

U.S. Appl. No. 15/662,708 filed in the name of Xiangping Chen et al. on Jul. 28, 2017 and entitled "Token-Based Data Flow Control in a Clustered Storage System."

* cited by examiner

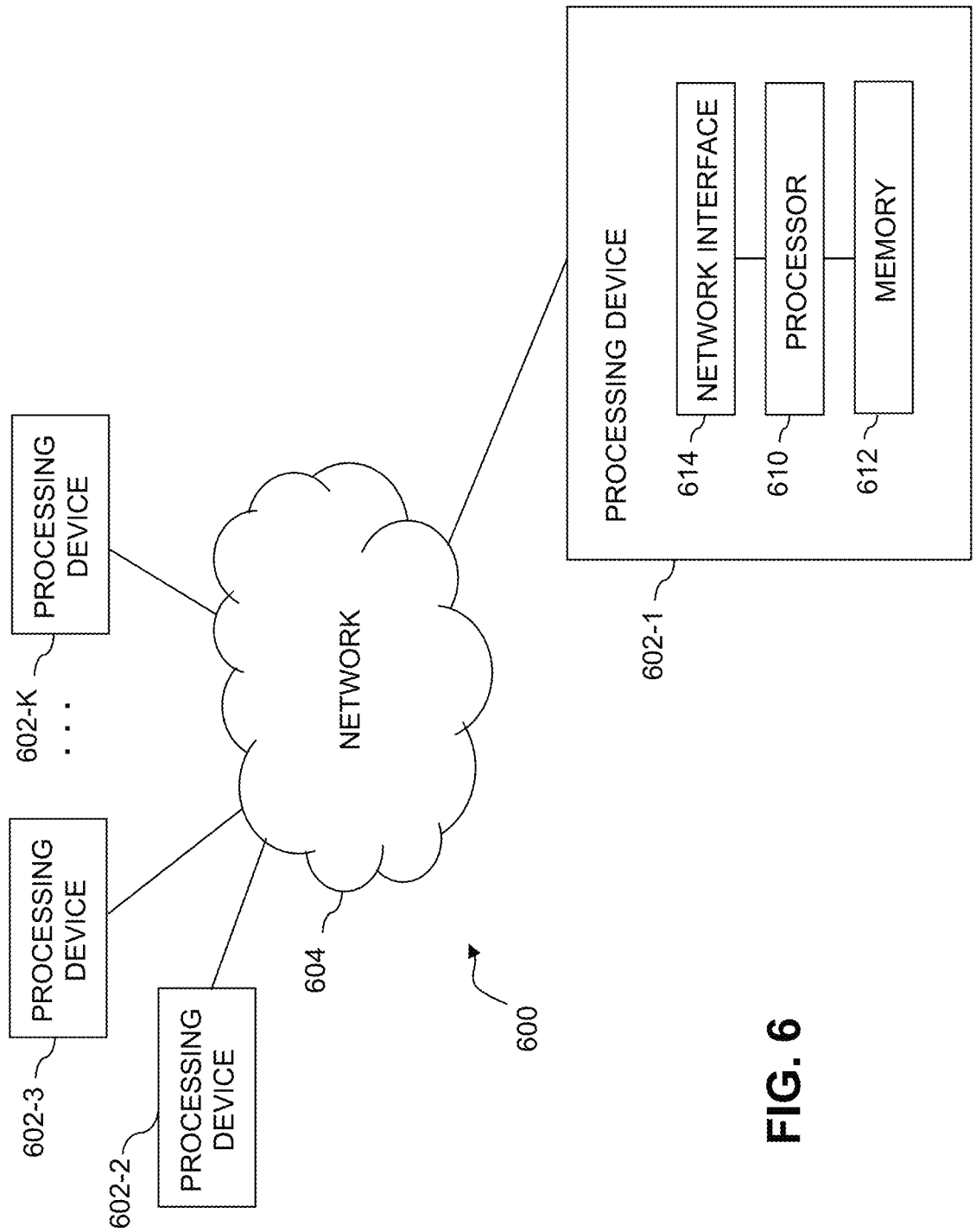

STORAGE SYSTEM CAPACITY EXPANSION USING MIXED-CAPACITY STORAGE DEVICES

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt from parity information, typically in response to a storage device failure or other type of failure within the storage system. Unfortunately, conventional RAID approaches generally assume that the storage devices over which the data is distributed all have the same storage capacity. For example, particular RAID parameters may be determined upon an initial deployment of a storage system that includes a particular number of solid state drives (SSDs) each having a 400 GigaByte (GB) capacity. It can be difficult under current practice to later incorporate higher-capacity storage devices such as 2 TeraByte (TB) SSDs into an existing storage system that has already implemented its RAID arrangement using lower-capacity storage devices such as the 400 GB SSDs. This unduly limits user options in expanding capacity of an existing storage system, possibly leading to excessive expansion costs by, for example, requiring the replacement of all of the lower-capacity storage devices or the addition of storage nodes to a distributed storage system.

SUMMARY

Illustrative embodiments provide techniques for capacity expansion using mixed-capacity SSDs or other types of mixed-capacity storage devices in a storage system. For example, some embodiments are configured to provide efficient techniques for expanding the storage capacity of an existing storage system through the use of higher-capacity storage devices, without requiring the replacement of all of the lower-capacity storage devices or the addition of storage nodes to a distributed storage system. References herein to "mixed-capacity storage devices" should be understood to encompass arrangements that include multiple storage devices of at least two different storage capacities, such as a first set of storage devices each having the same first capacity, and at least a second set of storage devices each having a second capacity higher than the first capacity.

In one embodiment, a storage system comprises a plurality of storage devices, with the storage devices comprising a first set of storage devices each having a first capacity and a second set of storage devices each having a second capacity higher than the first capacity. The storage system is further configured to establish an extended RAID group to extend existing RAID stripes of the storage devices of the first set into the storage devices of the second set, and to establish an additional RAID group for the storage devices of the second set, the additional RAID group comprising one or more additional RAID stripes for the storage devices of the second set.

The storage devices of the second set are illustratively added to the storage system in order to increase its storage capacity beyond a previous storage capacity provided by the storage devices of the first set.

In some embodiments, the existing RAID stripes of the storage devices of the first set are established by the storage system prior to addition of the storage devices of the second set into the storage system. For example, the storage devices of the second set are illustratively added into the storage system after the establishment of the existing RAID stripes of the first set in order to increase a total storage capacity of the storage system relative to its total storage capacity with only the storage devices of the first set.

The extended and additional RAID groups are illustratively part of a RAID arrangement that includes parity information supporting at least one recovery option for reconstructing data pages of at least one of the storage devices responsive to a failure of that storage device.

In some embodiments, the storage system comprises a distributed storage system that comprises a plurality of storage nodes each having a processor coupled to a memory and each comprising a corresponding subset of the storage devices. In such an embodiment, the extended and additional RAID groups may be established for a particular one of the storage nodes of the distributed storage system, with the particular storage node comprising the first and second sets of storage devices.

In some embodiments, an extended RAID stripe of the extended RAID group has a number of columns equal to a sum of the number of storage devices of the first set and the number of storage devices of the second set. Additionally or alternatively, an additional RAID stripe of the additional RAID group has a number of columns equal to the number of storage devices of the second set.

The extended and additional RAID groups in some embodiments are each configured in accordance with a RAID 6 arrangement supporting recovery from failure of up to two of the storage devices of the corresponding group, although other RAID arrangements can be used in other embodiments.

In some embodiments, data pages are stored across the storage devices of the extended and additional RAID groups using multiple RAID layers, wherein a size of a given one of the RAID layers is larger for the storage devices of the second set than it is for the storage devices of the first set. For example, an uppermost one of the RAID layers may comprise at least one of a RAID 1 layer and a RAID 1-3 layer and a lowermost one of the RAID layers may comprise a RAID 6 layer.

Activation of the additional RAID group may be performed responsive to a total number of the storage devices of the second set reaching a specified minimum threshold number of storage devices. Before the total number of the storage devices of the second set reaches the specified minimum threshold number of storage devices, portions of the storage devices of the second set to be used for the additional RAID group may be used for non-RAID data storage.

Activation or use of the extended RAID group in some embodiments does not require the minimum threshold number of storage devices in the second set. Accordingly, portions of the storage devices of the second set may be used for extending the existing RAID stripes in the extended RAID group before the total number of the storage devices of the second set reaches the specified minimum threshold number of storage devices.

The storage system in some embodiments is implemented as a content addressable storage (CAS) system, and more particularly as a distributed CAS system comprising a plurality of storage nodes, although it is to be appreciated that a wide variety of other types of storage systems can be used in other embodiments.

These and other illustrative embodiments include, without limitation, apparatus, systems, methods and processor-readable storage media.

BRIEF DESCRIPTION OF THE DRAWINGS

FIGS. 5 and 6 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
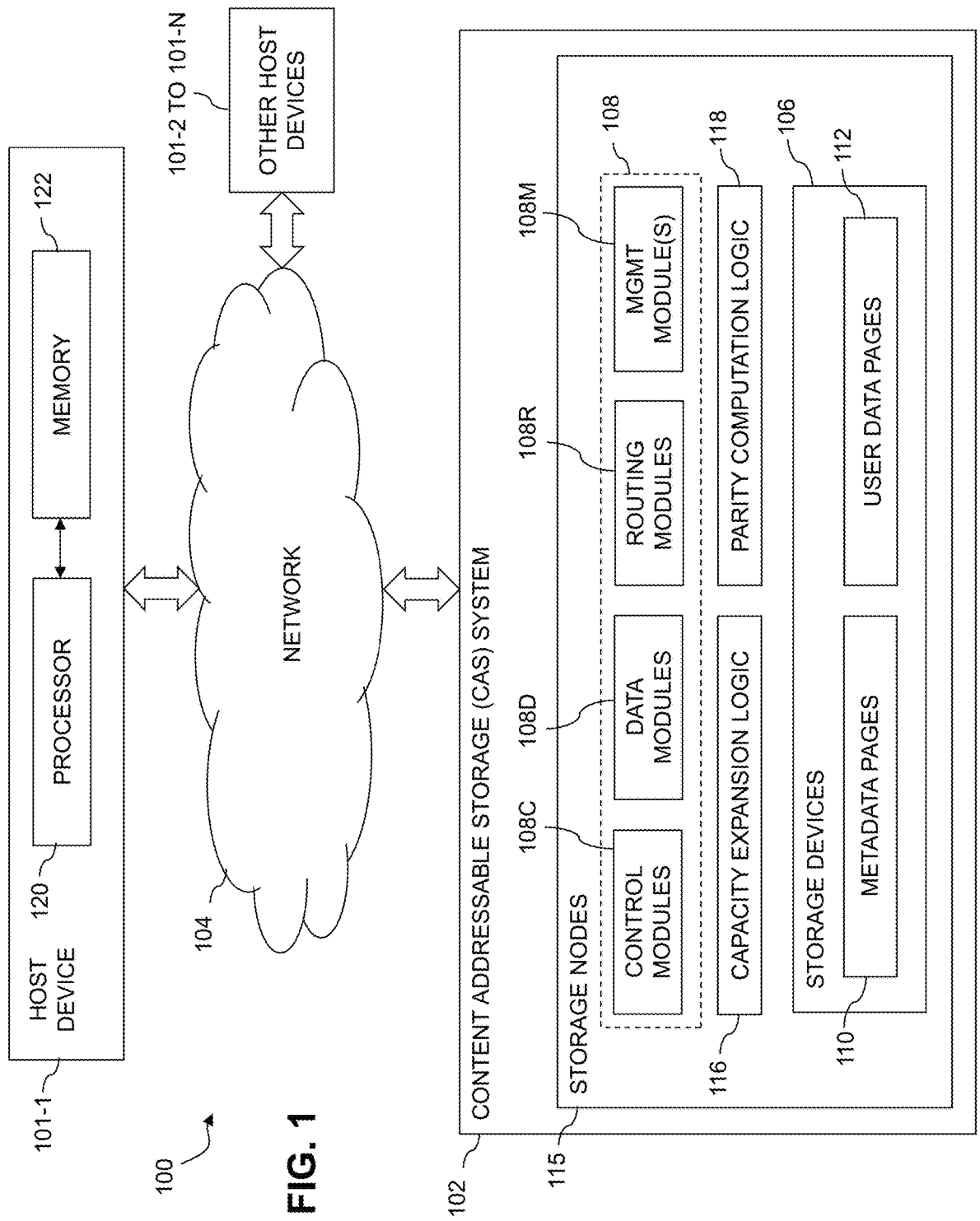
FIG. 1 is a block diagram of an information processing system comprising a CAS system incorporating functionality for capacity expansion using mixed-capacity storage devices in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a CAS system 102. The host devices 101 are configured to communicate with the CAS system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the CAS system 102. The term "input-output" as used herein refers to at least one of input and output. For example, IO operations may comprise write requests and/or read requests directed to logical addresses of a particular logical storage volume of the CAS system 102. These and other types of IO operations are also generally referred to herein as IO requests.

The CAS system 102 illustratively comprises processing devices of one or more processing platforms. For example, the CAS system 102 can comprise one or more processing devices each having a processor and a memory, possibly implementing virtual machines and/or containers, although numerous other configurations are possible.

The CAS system 102 can additionally or alternatively be part of cloud infrastructure such as an Amazon Web Services (AWS) system. Other examples of cloud-based systems that can be used to provide at least portions of the CAS system 102 include Google Cloud Platform (GCP) and Microsoft Azure.

The host devices 101 and the CAS system 102 may be implemented on a common processing platform, or on separate processing platforms. The host devices 101 are illustratively configured to write data to and read data from the CAS system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The CAS system 102 comprises a plurality of storage devices 106 and an associated storage controller 108. The storage devices 106 store data of a plurality of storage volumes. The storage volumes illustratively comprise respective logical units (LUNs) or other types of logical storage volumes. The stored data comprises metadata pages 110 and user data pages 112, both described in more detail elsewhere herein. The storage devices 106 and storage controller 108 are distributed across multiple storage nodes 115. The CAS system 102 further comprises capacity expansion logic 116 and parity computation logic 118, both also illustratively distributed across the storage nodes 115 of the CAS system 102. The capacity expansion logic 116 is configured to control the performance of a capacity expansion process using mixed-capacity storage devices, such as the process illustrated in FIG. 4. The parity computation logic 118 performs parity computations of various RAID arrangements, such as P and Q parity computations of RAID 6, in a manner to be described in more detail elsewhere herein.

The storage devices 106 of the CAS system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in CAS system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the CAS system 102 illustratively comprises a scale-out all-flash content addressable storage array such as an XtremIO™ storage array from Dell EMC of Hopkinton, Mass. A wide variety of other types of storage arrays can be used in implementing a given one of the CAS system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the CAS system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the CAS system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

A particular one of the host devices 101, namely a first host device 101-1, is shown in greater detail than the other host devices 101 in FIG. 1. The first host device 101-1, like the other host devices 101 of the system 100, interacts over the network 104 with the CAS system 102. Such interaction illustratively includes generating IO operations, such as read and write requests, and sending such requests over the network 104 for processing by the CAS system 102. The CAS system 102 in this embodiment implements functionality for capacity expansion using mixed-capacity storage devices, as will be described in more detail below.

The above-noted functionality illustratively includes the performance of a process for capacity expansion using mixed-capacity storage devices in the CAS system 102, such as the example process to be described below in conjunction with FIG. 4. References herein to "capacity expansion using mixed-capacity storage devices" are intended to be broadly construed, so as to encompass various types of capacity expansion arrangements that involve configuring a storage system to include multiple distinct storage devices of different capacities, and should not be viewed as requiring any particular types of storage devices or arrangements of differing storage device capacities. Moreover, as indicated previously, a wide variety of different storage system types can be used, and the disclosed embodiments should therefore not be viewed as being limited to CAS systems or distributed storage systems.

The storage controller 108 and the CAS system 102 may further include one or more additional modules and other components typically found in conventional implementations of storage controllers and storage systems, although such additional modules and other components are omitted from the figure for clarity and simplicity of illustration.

The host device 101-1 comprises a processor 120 coupled to a memory 122. The host device 101-1 is therefore an example of what is more generally referred to herein as a processing device comprising a processor coupled to a memory. The processor 120 executes application processes of one or more applications on behalf of each of one or more users of the host device 101-1. Such application process execution results in the generation of read operations and write operations that are directed by the host device 101-1 to the CAS system 102 in the manner disclosed herein.

The IO operations generated by the application processes may be placed in one or more IO queues to await further processing by the host device 101-1. Such IO queues may be implemented as part of the memory 122 of the host device 101-1, but could be implemented elsewhere in the host device 101-1.

In some embodiments, the host device 101-1 comprises a multi-path input-output (MPIO) driver configured to control delivery of IO operations from the host device 101-1 to the CAS system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device 101-1, and each of a plurality of targets of the initiator-target pairs comprising a corresponding port of the CAS system 102.

The MPIO driver may comprise, for example, an otherwise conventional MPIO driver, such as a PowerPath® driver from Dell EMC. Other types of MPIO drivers from other driver vendors may be used.

The term "MPIO driver" as used herein is intended to be broadly construed, and such a component is illustratively implemented at least in part as a combination of software and hardware. For example, the MPIO driver can comprise one or more software programs running on processor 120 of host device 101-1.

The MPIO driver is configured to deliver IO operations selected from its corresponding IO queues to the CAS system 102 via selected ones of multiple paths over the network 104. The sources of the IO operations stored in the IO queues illustratively include respective application processes of one or more applications executing on the host device 101-1. For example, IO operations can be generated by each of multiple processes of a database application running on the host device 101-1. Such processes issue IO operations for delivery to the CAS system 102 over the network 104. Other types of sources of IO operations may be present in a given implementation of system 100.

The host device 101-1 in directing an JO operation to the CAS system 102 illustratively sends one or more corresponding commands to CAS system 102 over a particular path selected by its MPIO driver, although other arrangements can be used. A given JO operation can therefore comprise one or more commands in a particular storage protocol that the host device 101-1 uses to communicate with the CAS system 102.

Each of the additional host devices 101-2 through 101-N is assumed to be configured in substantially the same manner described above for the first host device 101-1. It is also possible that different host devices of different types can each generate IO operations for delivery to the CAS system 102.

The CAS system 102 is illustratively implemented as a distributed storage system, also referred to herein as a clustered storage system, in which each of at least a subset of the storage nodes 115 comprises a set of processing modules configured to communicate with corresponding sets of processing modules on other ones of the storage nodes 115. The sets of processing modules of the storage nodes of the CAS system 102 collectively comprise at least a portion of the storage controller 108 of the CAS system 102. For example, in some embodiments the sets of processing modules of the storage nodes collectively comprise a distributed storage controller of the distributed CAS system 102. A "distributed CAS system" as that term is broadly used herein is intended to encompass any CAS system that, like the CAS system 102, is distributed across multiple storage nodes.

In the CAS system 102, logical addresses of data pages are mapped to physical addresses of the data pages using respective content-based signatures that are generated from those data pages. The data pages illustratively include user data pages 112. Metadata pages 110 are handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 102.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 108 in this embodiment is implemented as a distributed storage controller that comprises sets of processing modules distributed over the storage nodes 115. The storage controller 108 is therefore also referred to herein as a distributed storage controller.

It is assumed in some embodiments that the processing modules of the distributed storage controller 108 are interconnected in a full mesh network, such that a process of one of the processing modules can communicate with processes of any of the other processing modules. Commands issued by the processes can include, for example, RPCs directed to other ones of the processes.

The sets of processing modules of the distributed storage controller 108 illustratively comprise control modules 108C, data modules 108D, routing modules 108R and at least one management module 108M. Again, these and possibly other modules of the distributed storage controller 108 are interconnected in the full mesh network, such that each of the modules can communicate with each of the other modules, although other types of networks and different module interconnection arrangements can be used in other embodiments.

The management module 108M of the distributed storage controller in this embodiment may more particularly comprise a system-wide management module. Other embodiments can include multiple instances of the management module 108M implemented on different ones of the storage nodes 115. It is therefore assumed that the distributed storage controller 108 comprises one or more management modules 108M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the distributed storage controller 108 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of a distributed storage controller. For example, the mapping tables maintained by the control modules 108C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 108C may further comprise additional components such as respective messaging interfaces that are utilized by the control modules 108C to process routing-to-control messages received from the routing modules 108R, and to generate control-to-routing messages for transmission to the routing modules 108R. Such messaging interfaces can also be configured to process instructions and other messages received from the management module 108M and to generate messages for transmission to the management module 108M.

The data modules 108D comprise respective control interfaces. These control interfaces support communication between the data modules 108D and the control modules 108C. Also included in the data modules are respective SSD interfaces. These SSD interfaces support communications with corresponding ones of the storage devices 106 of the distributed storage system.

The above-described processing module arrangements are presented by way of example only, and can be varied in other embodiments.

In some embodiments, a given data path of the CAS system 102 comprises a particular one of the routing modules 108R, a particular one of the control modules 108C and a particular one of the data modules 108D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 108 using well-known communication protocols such as TCP/IP and remote direct memory access (RDMA). For example, respective sets of IP links used in data transfer and corresponding messaging could be associated with respective different ones of the routing modules 108R.

In some embodiments, at least portions of the functionality for capacity expansion using mixed-capacity storage devices in the CAS system are distributed over at least the control modules 108C and data modules 108D of storage controller 108. Numerous other arrangements are possible. For example, portions of the functionality can be implemented in the one or more management modules 108, or using other types and arrangements of modules within or outside of the storage controller 108.

As indicated previously, the storage devices 106 are configured to store metadata pages 110 and user data pages 112, and may also store additional information not explicitly shown such as checkpoints, write cache journals and other types of write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users of the CAS system 102. Each such LUN may comprise particular ones of the above-noted pages of the user data area. The user data stored in the user data pages 112 can include any type of user data that may be utilized in the system 100. The term "user data" herein is therefore also intended to be broadly construed.

A given storage volume for which content-based signatures are generated, illustratively by signature generators implemented on respective ones of the control modules 108R, illustratively comprises a set of one or more LUNs, each including multiple ones of the user data pages 112 stored in storage devices 106.

The CAS system 102 in the embodiment of FIG. 1 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the CAS system 102 is illustratively stored as metadata pages 110 in the metadata area. The generation and storage of the hash metadata is assumed to be performed under the control of the storage controller 108.

Each of the metadata pages 110 characterizes a plurality of the user data pages 112. For example, in a given set of n user data pages representing a portion of the user data pages 112, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 102 is illustratively distributed among the control modules 108C.

The functionality for capacity expansion using mixed-capacity storage devices in the CAS system 102 in this embodiment is assumed to be distributed across multiple distributed processing modules, including at least a subset of the processing modules 108C, 108D, 108R and 108M of the distributed storage controller 108.

For example, the management module 108M of the storage controller 108 may include a capacity expansion logic instance that engages corresponding capacity expansion logic instances in all of the control modules 108C in order to support capacity expansion using mixed-capacity storage devices in the CAS system 102.

In some embodiments, each of the user data pages 112 has a fixed size such as, for example, 8 KB, and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller in this example is configured to group consecutive pages into page groups, to arrange the page groups into slices, and to assign the slices to different ones of the control modules 108C. For example, if there are 1024 slices distributed evenly across the control modules 108C, and there are a total of 16 control modules in a given implementation, each of the control modules "owns" 1024/16=64 slices. In such arrangements, different ones of the slices are assigned to different ones of the control modules 108C such that control of the slices within the storage controller 108 of the CAS system 102 is substantially evenly distributed over the control modules 108C of the storage controller 108.

The data modules 108D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 108C but are accessed using the data modules 108D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 102 each illustratively comprise one or more IO operations directing that at least one data item of the CAS system 102 be written to in a particular manner. A given write request is illustratively received in the CAS system 102 from a host device over a network. In some embodiments, a write request is received in the distributed storage controller 108 of the CAS system 102, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 108C, data modules 108D and routing modules 108R of the storage nodes 115 communicate with one another over a high-speed internal network such as an InfiniBand network. The control modules 108C, data modules 108D and routing modules 108R coordinate with one another to accomplish various IO processing tasks.

The write requests from the host devices identify particular data pages to be written in the CAS system 102 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 102 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 102. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 108C, while the HMD and PLB tables are utilized primarily by the data modules 108D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 102. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 102 correspond to respective physical blocks of a physical layer of the CAS system 102. The user data pages of the logical layer are organized by LBA and have reference via respective content-based signatures to particular physical blocks of the physical layer.

Each of the physical blocks has an associated reference count that is maintained within the CAS system 102. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for capacity expansion using mixed-capacity storage devices in a CAS system in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a CAS system can be used in other embodiments.

As indicated above, the CAS system 102 illustratively comprises storage nodes 115 interconnected in a mesh network, with each such storage node comprising a set of processing modules configured communicate with corresponding sets of processing modules on other ones of the storage nodes. A given such set of processing modules comprises at least a routing module, a control module and a data module, with the sets of processing modules of the storage nodes 115 of the CAS system 102 collectively comprising at least a portion of the storage controller 108 of the CAS system 102.

The storage nodes 115 and their respective sets of processing modules are managed by a system manager, illustratively implemented as a management module 108M within the set of processing modules on at least one of the storage nodes 115. Each storage node 115 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

Figure 2:
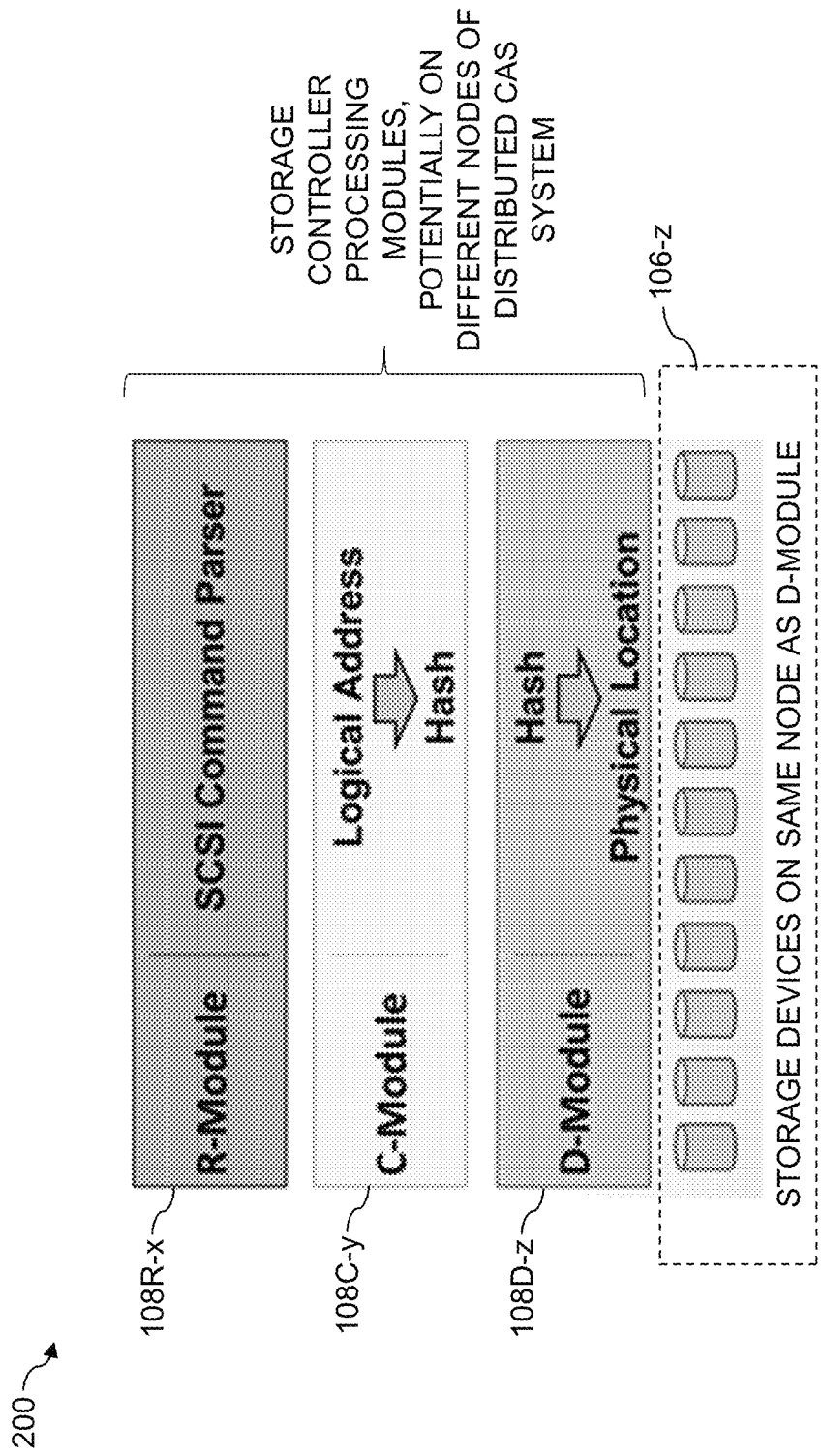
FIG. 2 shows an example relationship between routing, control and data modules of a CAS system in an illustrative embodiment.

An example of the operation of the CAS system 102 in processing IO operations will now be described with reference to FIG. 2, which shows the relationship between routing, control and data modules of one possible distributed implementation of CAS system 102 in an illustrative embodiment. More particularly, FIG. 2 illustrates a portion 200 of the CAS system 102, showing a routing module 108R-x, a control module 108C-y and a data module 108D-z in a distributed implementation of the storage controller 108. The routing module 108R-x, control module 108C-y and data module 108D-z are also denoted in this embodiment as an R-module, a C-module and a D-module, respectively.

These modules are respective processing modules of the storage controller 108, and are potentially located on different ones of the storage nodes 115 of the distributed CAS system 102. For example, each of the storage nodes 115 of the distributed CAS system 102 illustratively comprises at least one R-module, at least one C-module and at least one D-module, although many other storage node configurations are possible. In the present embodiment, the routing module 108R-x, the control module 108C-y and the data module 108D-z are assumed to be on respective different storage nodes x, y and z of the distributed CAS system 102. The storage nodes x, y and z represent respective particular ones of the storage nodes 115. The storage node z that implements the D-module 108D-z comprises a subset of the storage devices 106 of the distributed CAS system 102, with the subset of storage devices 106 on storage node z being denoted as storage devices 106-z. Each of the other storage nodes 115 of the distributed CAS system 102 similarly has a different subset of the storage devices 106 associated therewith.

It is assumed in this example that the distributed CAS system 102 manages data using a fixed-size page granularity (e.g., 4 KB, 8 KB or 16 KB), also referred to herein as the native page size of the distributed CAS system 102. A unique hash digest is computed for each of the data pages by a content-based signature generator, illustratively using SHA1 or another secure hashing algorithm of the type described elsewhere herein.

In the distributed CAS system 102, routing modules 108R such as R-module 108R-x illustratively include a SCSI command parser as shown, although other command parsers for other storage protocols can be used in other embodiments. The routing modules 108R receive IO requests from the host device 101-1, parse the corresponding SCSI commands and route them to the appropriate control modules 108C, which may be located on different storage nodes 115, illustratively using an address-to-control ("A2C") table. The A2C table maps different portions of a logical address space of the distributed CAS system 102 across different ones of the control modules 108C. A given IO request can be sent by the host device 101-1 to any of the routing modules 108R of the distributed CAS system 102.

The control modules 108C such as control module 108C-y receive the IO requests from the routing modules 108R, and use mapping tables such as the above-described A2H and H2D tables to identify the appropriate data modules 108D that store the corresponding data pages in the distributed CAS system 102. This illustratively includes performing a logical address to hash mapping as shown in the figure.

In processing read requests, the C-module 108C-y retrieves from the A2H table the hash digests of the corresponding requested pages, and sends read requests to the appropriate data modules 108D based on the H2D table.

In processing write requests, the C-module 108C-y illustratively computes the hash digests of the data pages based on the write data, sends write requests to the corresponding data modules 108D as determined from the H2D table, and updates the A2H table. In some embodiments, write request processing additionally or alternatively makes use of a write cache and a corresponding write cache journal.

The data modules 108D such as D-module 108D-z are responsible for the physical storage of the data pages, and use mapping tables such as the above-described HMD and PLB tables or other types of H2P tables to determine the physical location of a given data page in the subset of storage devices 106 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 108D in some embodiments additionally store a copy or "mirror" of such metadata in a memory of the respective corresponding storage nodes 115, in order to optimize performance by reducing accesses to the associated storage devices 106 during system operation.

The host device 101-1 illustratively sends an IO request to a particular one of the routing modules 108R, illustratively using random selection or another type of algorithm such as round robin to select a particular routing module for a particular IO request. Such selection can be implemented as part of a path selection algorithm performed by an MPIO driver of the host device 101-1 to select a particular path comprising an initiator-target pair for delivery of the IO request to the CAS system 102.

The particular example described above in conjunction with FIG. 2 should not be construed as limiting in any way, and a wide variety of other implementations of the CAS system 102 are possible.

The manner in which the CAS system 102 is configured to implement capacity expansion using mixed-capacity SSDs or other types of mixed-capacity storage devices 106 will now be described in more detail, with reference to FIGS. 3 and 4. As indicated previously, such an embodiment advantageously allows the storage capacity of an existing storage system such as an initial deployment of CAS system 102 to be subsequently expanded through the addition of higher-capacity storage devices, without requiring the replacement of all of the lower-capacity storage devices 106 or the addition of more storage nodes 115.

It is assumed in the present embodiment that an initial deployment of the CAS system 102 includes storage devices 106 that are all of the same capacity. For example, all of the storage devices 106 may initially comprise SSDs each having a particular capacity, such as solid state drives (SSDs) each having a 400 GB capacity. Further assume that it is desirable to later increase the storage capacity of the CAS system 102 by adding to at least one of the storage nodes 115 a plurality of additional storage devices 106 of a higher capacity, such as 2 TB SSDs, but without replacing any of the existing lower-capacity storage devices 106, and without adding any additional storage nodes 115 to the CAS system 102. As mentioned previously, it can be difficult under current practice to implement such a capacity expansion in an existing storage system that has already implemented a RAID arrangement using lower-capacity storage devices such as the 400 GB SSDs.

Figure 3A:
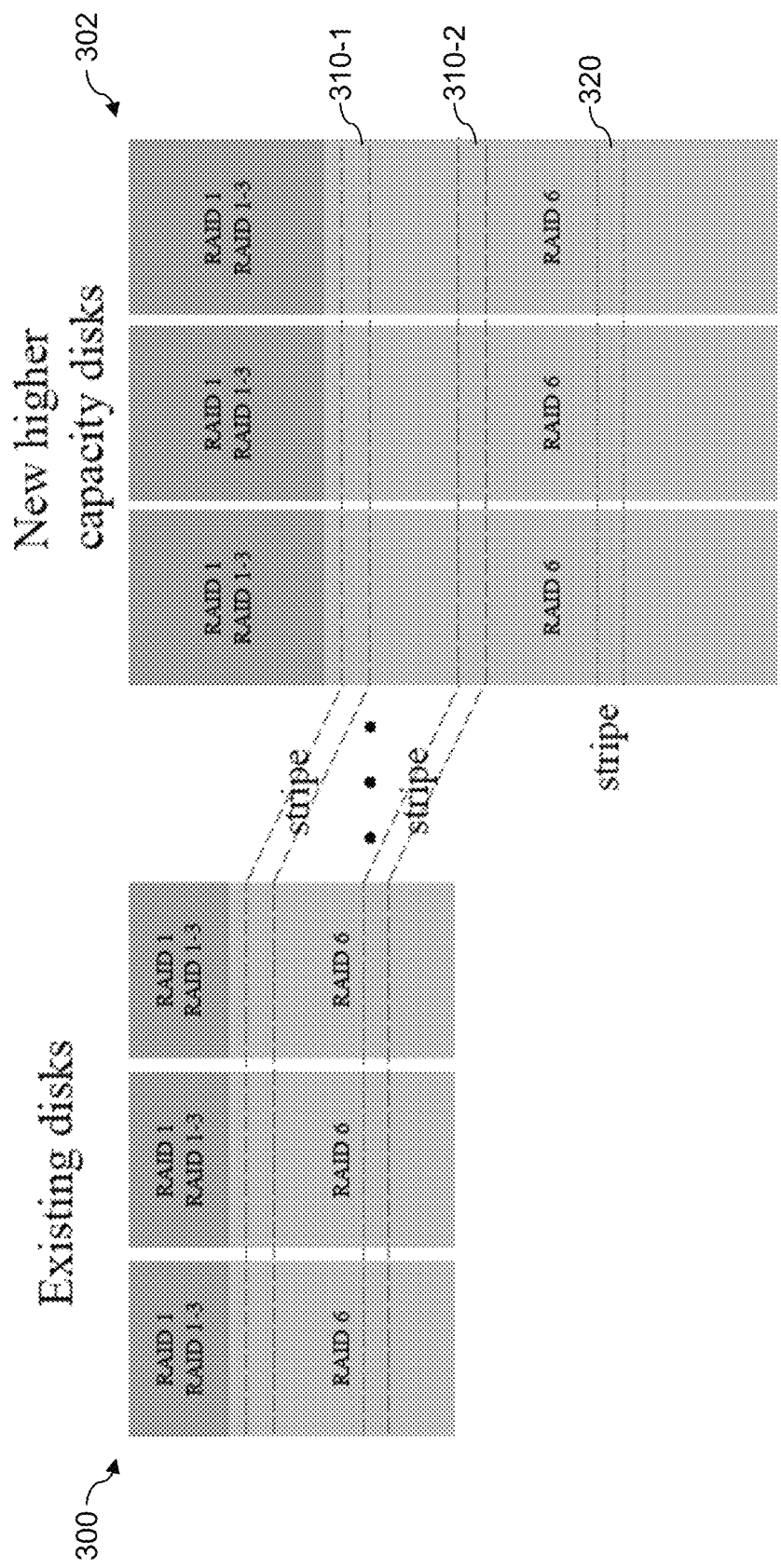
FIGS. 3A and 3B show examples of RAID arrangements utilized to distribute data across multiple storage devices in an illustrative embodiment. These figures are collectively referred to herein as FIG. 3.
Figure 3B:
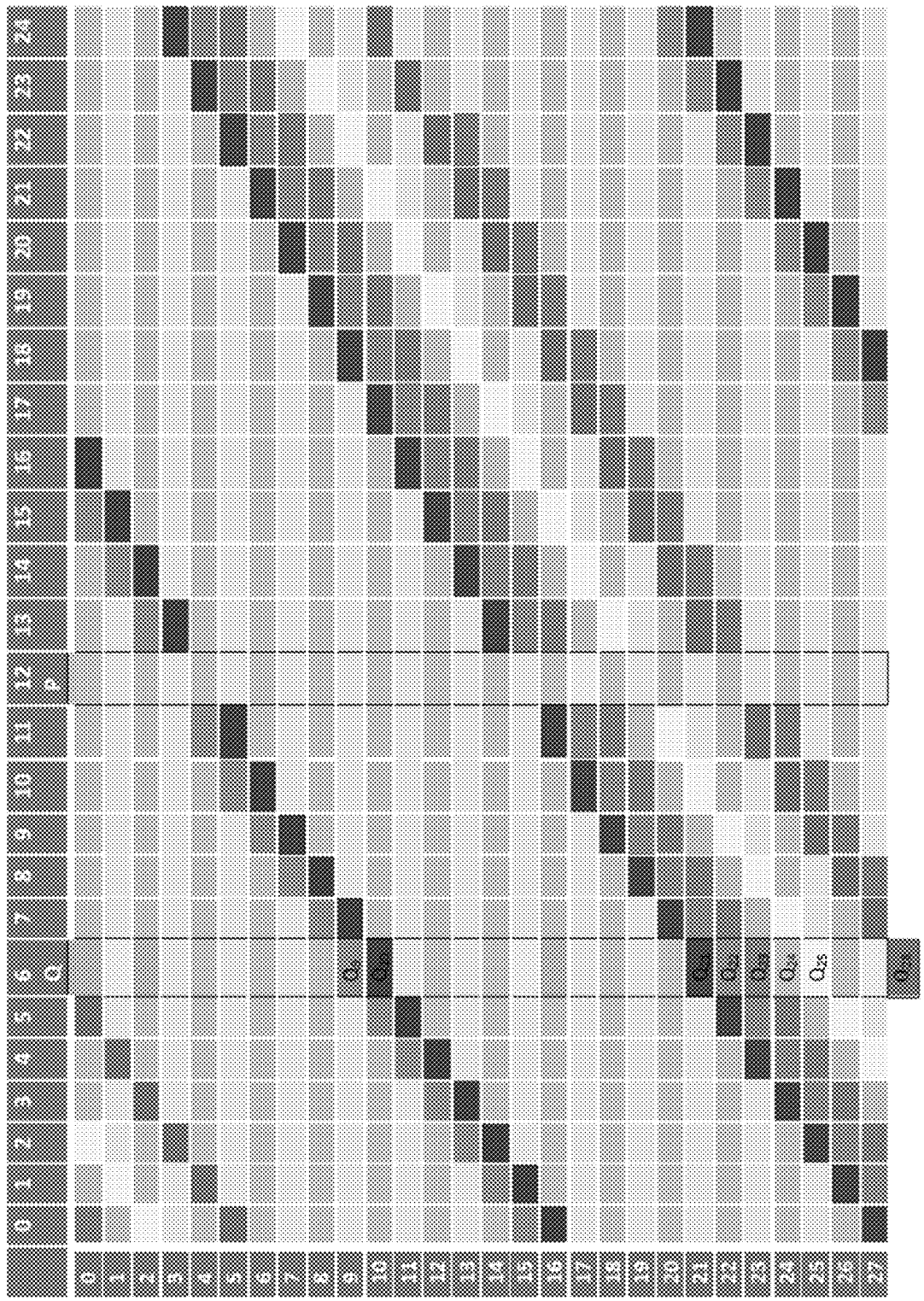

FIG. 3 illustrates example RAID arrangements utilized to distribute data across the storage devices 106 of the CAS system 102, and includes FIGS. 3A and 3B.

Referring initially to FIG. 3A, the storage devices 106 of a given one of the storage nodes 115 of the CAS system 102 are shown after a capacity expansion of the type described above. After such an expansion, the CAS system 102 still has a plurality of storage devices 106, but with the storage devices 106 now comprising a first set of storage devices 300 each having a first capacity and a second set of storage devices 302 each having a second capacity higher than the first capacity. The first set of storage devices 300 are referred to in the figure as "existing disks" and the second set of storage devices 302 are referred to in the figure as "new higher-capacity disks." Again, these and other references to "disks" herein are intended to be broadly construed, and should not be viewed as being limited to disk-based storage devices. In the context of the previous example, the existing disks may comprise, for example, SSDs each having a 400 GB capacity, and the new higher-capacity disks may comprise, for example, SSDs each having a 2 TB capacity, although it is to be appreciated that many other variations in storage device types and capacities can be used.

The CAS system 102 in this embodiment is further configured to establish an extended RAID group to extend existing RAID stripes of the storage devices of the first set 300 into the storage devices of the second set 302, and to establish an additional RAID group for the storage devices of the second set 302, with the additional RAID group comprising one or more additional RAID stripes for the storage devices of the second set.

The extended RAID stripes of the extended RAID group are illustrated by stripes 310-1 and 310-2 in the figure, and the additional RAID stripe for the additional RAID group is illustrated by stripe 320 in the figure.

The RAID arrangement of FIG. 3A therefore includes two RAID groups, namely, the extended RAID group, which extends the existing RAID 6 stripes of the first set 300 by adding new higher-capacity storage devices and therefore respective new RAID columns, and the additional RAID group, which includes additional RAID stripes using just the new higher-capacity storage devices. The additional RAID group therefore has a lesser number of storage devices and therefore columns than the extended RAID group.

In this embodiment, it is assumed that the storage devices of the second set 302 are illustratively added to the CAS system 102 system in order to increase its storage capacity beyond a previous storage capacity provided by the storage devices of the first set 300.

The existing RAID stripes of the storage devices of the first set 300 are illustratively established by the CAS system 102 prior to addition of the storage devices of the second set 302 into the CAS system 102. For example, the storage devices of the second set 302 are illustratively added into the CAS system 102 after the establishment of the existing RAID stripes of the first set 300 in order to increase a total storage capacity of the CAS system 102 relative to its total storage capacity with only the storage devices of the first set 300.

The extended and additional RAID groups are illustratively part of a RAID arrangement that includes parity information supporting at least one recovery option for reconstructing data pages of at least one of the storage devices responsive to a failure of that storage device. For example, extended and additional RAID groups in some embodiments are each configured in accordance with a RAID 6 arrangement supporting recovery from failure of up to two of the storage devices of the corresponding group, although other RAID arrangements can be used in other embodiments.

The extended and additional RAID groups in the FIG. 3 embodiment are illustratively established for a particular one of the storage nodes 115 of the distributed CAS system 102, with the particular storage node comprising the first and second sets of storage devices 300 and 302. The first and second sets of storage devices 300 and 302 associated with the particular one of the storage nodes 115 are illustratively part of a DAE of that storage node, although other storage device arrangements are possible. Each such storage device illustratively comprises an SSD, HDD or other type of storage drive. Similar arrangements can be implemented to expand the storage capacity of each of one or more other ones of the storage nodes 115.

In some embodiments, a given extended RAID stripe 310-1 or 310-2 of the extended RAID group has a number of columns equal to a sum of the number of storage devices of the first set and the number of storage devices of the second set. Additionally or alternatively, an additional RAID stripe of the additional RAID group has a number of columns equal to the number of storage devices of the second set.

Data pages of the type described above are illustratively stored across the storage devices of the extended and additional RAID groups using multiple RAID layers, wherein a size of a given one of the RAID layers is larger for the storage devices of the second set 302 than it is for the storage devices of the first set 300. For example, an uppermost one of the RAID layers may comprise at least one of a RAID 1 layer and a RAID 1-3 layer and a lowermost one of the RAID layers may comprise a RAID 6 layer.

More particularly, with regard to the FIG. 3A embodiment, an uppermost one of the RAID layers is a RAID 1 layer, followed by an intermediate RAID 1-3 layer, and finally the lowermost layer, which is the RAID 6 layer. In this embodiment, the sizes of the RAID 1 and RAID 1-3 layers are larger for the storage devices of the second set 302 than for the storage devices of the first set 300.

In the example arrangement shown, the storage devices are assumed to include headers that store bootstrap data used to locate positioning tables for the above-noted layers. Such headers are written to all of the storage devices.

The uppermost RAID layer following the headers includes a RAID 1 or mirror layer which illustratively stores triplets of storage device identifiers (IDs), along with an offset, which together comprise a "section" that includes multiple pages in RAID 1-3. This data is updated only when a storage device fails and during a RAID 1-3 rebuild process. This data is mirrored across all of the storage devices.

The RAID 1-3 layer stores metadata, with every "section" composed of multiple pages being triplicated in accordance with mirrored positioning tables in three different storage devices in the DAE.

The RAID 6 layer stores data in a RAID 6 parity-protected scheme to persist data pages and possibly also metadata pages. The RAID 6 scheme defines stripes that can be viewed as a table of pages, with each stripe including all the storage devices of its corresponding RAID group in the DAE. In other words, the number of columns of the RAID 6 scheme is equal to the number of storage devices. The number of rows is fixed and is related to the RAID 6 algorithm. In each stripe, some columns (i.e., storage devices) are used for parity information. A given RAID group forms a RAID "failure domain" supporting recovery in the presence of up to two simultaneous storage device failures.

Accordingly, in the present example, the sizes of the layers are interrelated. For example, RAID 1-3 holds metadata to describe RAID 6 (e.g., the parity storage devices in each stripe), and the RAID 1 layer holds the triplets of storage devices for each "section" in RAID 1-3. The new higher-capacity storage devices will be formatted (e.g., configured with layer sizes) to support the additional capacity, including larger portions for headers, RAID 1, RAID 1-3, and RAID 6 sections.

Activation of the additional RAID group may be performed responsive to a total number of the storage devices of the second set reaching a specified minimum threshold number of storage devices. For example, calculation of the RAID 1-3 size depends on the number of storage devices, and so the additional RAID group in such embodiments is not activated for use with RAID stripes until the minimum threshold number of higher-capacity storage devices is reached. Any new storage capacity that is not used for RAID 6 stripes because there are not yet a sufficient number of the higher-capacity storage devices, can instead be used for storage of data that does not require RAID 6 protection. For example, such data can include system traces, and can be relocated to other parts of the CAS system 102 once the minimum number of higher-capacity storage devices required for RAID 6 is met. It should be appreciated that portions of the storage capacity of the higher-capacity storage devices to be used for the extended RAID group may be activated or otherwise used to extend the existing RAID 6 stripes before the minimum threshold number of higher-capacity storage devices is reached, as the extended RAID group does not require a minimum number of new storage devices.

Storage device removal in CAS system 102 is illustratively implemented using a rebuild flow in which higher-capacity storage devices are added after a removal of lower-capacity storage devices. When a storage device is removed, a rebuild process starts, where the data that was located on the removed storage device is recovered using the RAID 6 parity information, and is stored in other locations in the CAS system 102.

Storage device addition in CAS system 102 is illustratively implemented using an integrate flow in which a high-capacity storage device is added, the existing RAID 6 stripes are extended using the extended RAID group, and an integrate process starts, which will add the new storage device as a new column in the existing RAID 6 stripes. Since parity information is updated on every write to a stripe, the parity columns are spread uniformly on all storage devices, so a single storage device will not be a bottleneck. Therefore, for the RAID 6 stripes where the new storage device should be a parity column, the integrate process will calculate and store the parity in the new storage device.

Turning now to FIG. 3B, an example structure of a RAID 6 stripe is shown in an embodiment with 25 storage devices in the RAID group. The columns in the figure correspond to respective storage devices, with storage devices 12 and 6 being used to store respective P and Q parity information of the RAID 6 arrangement as shown.

RAID 6 uses an N+2 parity scheme, which allows failure of two storage devices, where N in this context denotes the number of data storage devices in the RAID group, also referred to below as a RAID array, which are supplemented by two additional parity storage devices P and Q. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double storage device failures, while user data is kept in the clear. This additional requirement assures that user reads are not affected by the RAID scheme under normal system operation. Examples of RAID 6 schemes include those that utilize the Reed Solomon error correction code and those that utilize parity bits, such as those in which N data storage devices are supported by two redundancy storage devices P and Q each holding a different type of parity information. It should be noted that if all parity bits are on the same two storage devices, then the performance may be subject to bottlenecks. This can be solved by use of distributed parity stripes over N+2 storage devices similar to that specified in RAID 5.

Examples of coding schemes based on parity calculations of rows and diagonals in a matrix of blocks include Even/Odd and Row Diagonal Parity (RDP). Both of these schemes utilize a first parity storage device P that holds the parities of rows of blocks as well as a second parity storage device Q that contains blocks that hold the parity of diagonals of data blocks. In both schemes, it may be advantageous to work with a block size that is smaller than the native page size. For example, the native page size may be 8 KB, while the block size is smaller but evenly divisible into 8 KB, e.g., 0.5 KB, 1 KB, 2 KB, 4 KB. In an example where the native page size is 8 KB and the block size is 2 KB, each stripe thus may contain four rows, and thus the four blocks present on each storage device form a single native page. However, a stripe can also be defined by multiple rows of blocks distributed across the storage devices of the RAID array. It is assumed that pages are read and written using a single operation.

In an example RAID array, each of the storage devices in the array stores a column of data blocks. The same data block in successive storage devices forms a row, which is to say the rows cross the storage devices. The data storage blocks are stored alongside parity data blocks in parity storage devices denoted P and Q, and the numbers of data blocks in the different columns or storage devices may be different. Row parity blocks are placed in a row parity column in storage device P, and the diagonal parity data is placed in diagonal parity blocks in storage device Q. Note that parity data stored in parity storage devices P and Q is computed using parity computation logic 118 of the CAS system 102.

The number of diagonals is generally one greater than the number of rows. Thus, the diagonal parity column in storage device Q includes one more block than the other columns for the data storage devices and the row parity storage device P. This is illustrated in FIG. 3B as the storage device Q is "taller" than the data storage devices and the storage device P. Additionally, the number of data columns is typically a prime number. In the FIG. 3B example this prime number is 23, corresponding to the 23 data storage devices 0-5, 7-11 and 13-24, with storage devices 6 and 12 being used for parity information. It should be noted that, in practice, the various columns may be distributed over the available physical storage devices to avoid system bottlenecks.

It should also be appreciated that there are numerous other ways to distribute data blocks in a RAID array. For example, in some cases it may be desired to provide more than one row parity column, which results in higher capacity overhead but which allows for a faster rebuild after a single storage device failure.

Additional details regarding example RAID techniques that may be used in illustrative embodiments herein are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein.

The CAS system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources.

As indicated previously, the host device 101-1 and possibly the other host devices 101-2 through 101-N may be implemented in whole or in part on the same processing platform as the CAS system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 101-1 and the CAS system 102 to reside in different data centers. Numerous other distributed implementations of the host device 101-1 and the CAS system 102 are possible.

Additional examples of processing platforms utilized to implement host devices 101 and CAS system 102 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, CAS system 102, network 104, storage devices 106, storage controller 108, capacity expansion logic 116, parity computation logic 118, processor 120 and memory 122 can be used in other embodiments.

It should be understood that the particular sets of modules and other components implemented in the system 100 as illustrated in FIGS. 1 through 3 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 4, which implements a process for capacity expansion using mixed-capacity storage devices in the CAS system 102. The process illustratively comprises an algorithm implemented at least in part by the storage controller 108 and its processing modules 108C, 108D, 108R and 108M distributed over the storage nodes 115 of CAS system 102. The storage devices 106 in this embodiment are more particularly referred to as "drives" and may comprise, for example, a combination of lower-capacity drives and higher-capacity drives. The drives can comprise, for example, SSDs, HDDs, hybrid drives or other types of drives.

Figure 4:
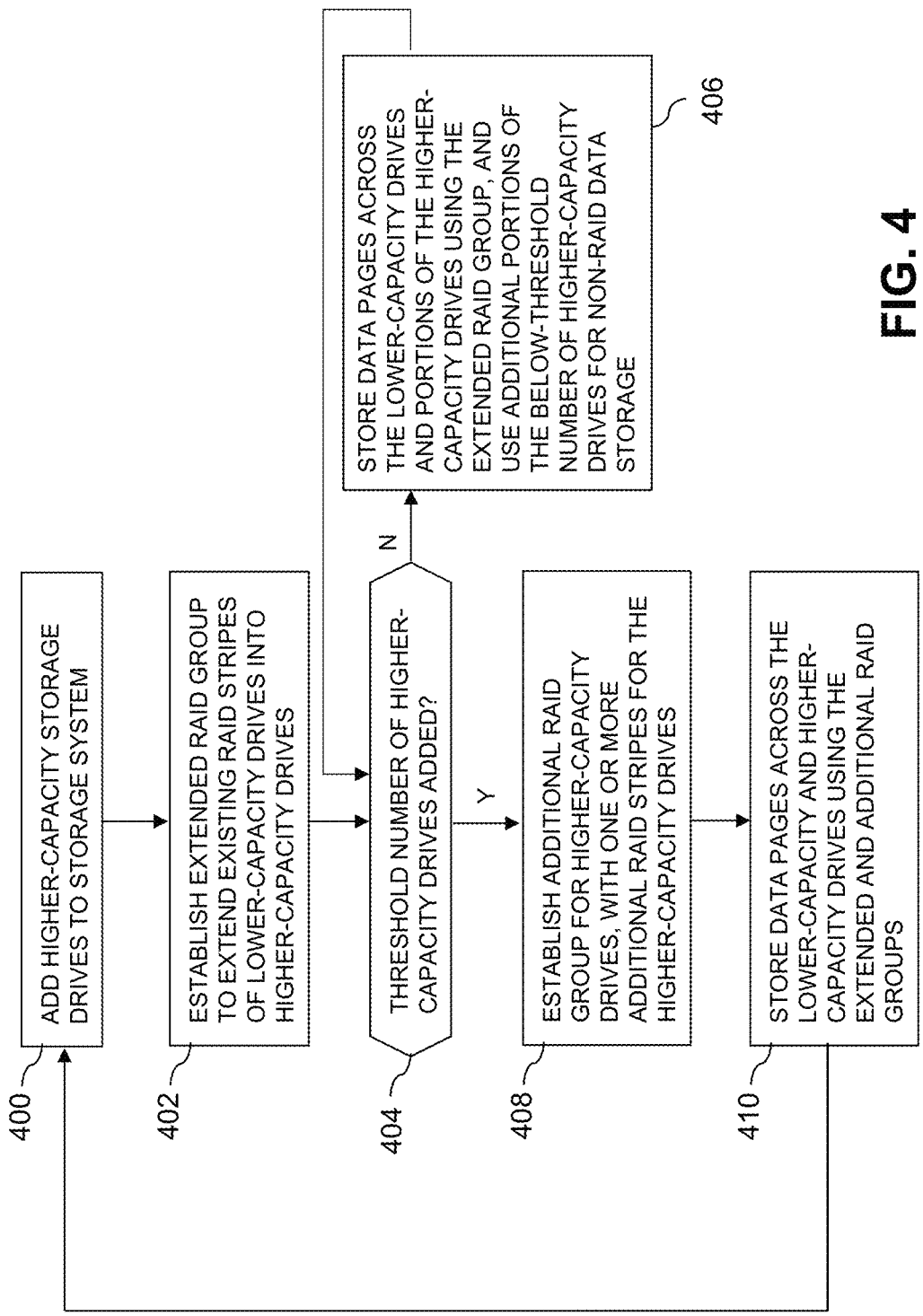
FIG. 4 is a flow diagram of a process for capacity expansion using mixed-capacity storage devices in a CAS system in an illustrative embodiment.

The process as illustrated in FIG. 4 includes steps 400 through 410, and is described in the context of CAS system 102 but is more generally applicable to a wide variety of other types of storage systems each comprising a plurality of storage devices.

In step 400, higher-capacity drives are added to existing lower-capacity drives of the CAS system 102. For example, the higher-capacity drives are illustratively added to existing lower-capacity drives of at least a particular one of the storage nodes 115 of the CAS system 102. Different instances of the FIG. 4 process can be performed for different ones of the storage nodes 115 of the CAS system 102.

In step 402, the CAS system 102 establishes an extended RAID group to extend existing RAID stripes of lower-capacity drives into higher-capacity drives. Examples of extensions of existing RAID stripes of lower-capacity drives into higher-capacity drives include the stripes 310-1 and 310-2 of the FIG. 3A embodiment.

In step 404, a determination is made as to whether or not a designated threshold number of higher-capacity drives have been added, for example, to the particular storage node of the CAS system 102. The designated threshold number of higher-capacity drives illustratively comprises a minimum number of high-capacity drives required to support a particular RAID arrangement, such as a RAID 6 arrangement that computes and stores parity information supporting recovery from up to two drive failures. If the threshold number of higher-capacity drives have been added, the process moves to step 408, and otherwise moves to step 406.

In step 406, which is reached if the number of added high-capacity drives is less than the threshold number of higher-capacity drives, the CAS system 102 stores data pages of the type described previously herein across the lower-capacity drives and portions of the higher-capacity drives using the extended RAID group. The RAID stripes can be structured in the manner illustrated in the RAID 6 example of FIG. 3B which includes a total of 25 drives, with drives 12 and 6 being used for respective P and Q parity information as shown. Step 406 further includes the CAS system 102 using additional portions of the below-threshold number of higher-capacity drives for non-RAID data storage. For example, such data can include any data that is not required to be protected by RAID 6, where RAID 6 has a minimum drive number requirement for implementation.

In step 408, the CAS system 102 establishes an additional RAID group for higher-capacity drives, with one or more additional RAID stripes for the higher-capacity drives. An example of an additional RAID stripe for the higher-capacity drives includes the stripe 320 of the FIG. 3A embodiment.

In step 410, the CAS system 102 stores data pages of the type described previously herein across the lower-capacity and higher-capacity drives using the extended and additional RAID groups. The RAID stripes can be structured in the manner illustrated in the RAID 6 example of FIG. 3B which includes a total of 25 drives, with drives 12 and 6 being used for respective P and Q parity information as shown.

As indicated above, different instances of the process of FIG. 4 can be performed for different portions of the CAS system 102, such as different ones of the storage nodes 115 of the CAS system 102. The steps are shown in sequential order for clarity and simplicity of illustration only, and certain steps can at least partially overlap with other steps.

The particular processing operations and other system functionality described in conjunction with the flow diagram of FIG. 4 are presented by way of illustrative example only, and should not be construed as limiting the scope of the disclosure in any way. Alternative embodiments can use other types of processing operations for capacity expansion using mixed-capacity storage devices in a CAS system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different capacity expansion processes for respective different distributed CAS systems or portions thereof within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in CAS system 102 that is configured to perform the steps of the FIG. 4 process can be implemented as part of what is more generally referred to herein as a processing platform comprising one or more processing devices each comprising a processor coupled to a memory.

A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms. For example, respective distributed modules of storage controller 108 can be implemented in respective containers running on respective ones of the processing devices of a processing platform.

Accordingly, the storage controller 108 is configured to support functionality for capacity expansion using mixed-capacity storage devices of the type previously described in conjunction with FIGS. 1 through 4. For example, capacity expansion logic instances implemented on respective ones of the control modules 108C are configured to control performance of a process such as that shown in FIG. 4, in order to achieve capacity expansion using mixed-capacity storage devices in the CAS system 102.

Illustrative embodiments of a storage system with functionality for capacity expansion using mixed-capacity storage devices in a CAS system as disclosed herein can provide a number of significant advantages relative to conventional arrangements.

For example, these embodiments advantageously support the use of mixed-capacity storage devices within a storage system, thereby allowing higher-capacity storage devices to be easily and efficiently added to existing lower-capacity storage devices of the storage system, without adversely impacting system performance. As a result, the storage system can provide greater overall capacity at reduced cost.

Such arrangements avoid the need to replace all of the lower-capacity storage devices in expanding storage capacity of the storage system, or to add only more of the same lower-capacity storage devices to the storage system.

In addition, such arrangements avoid the need to increase the number of storage nodes in a distributed storage system. An increase in the number of storage nodes would require increasing the computational resources of the storage system, even when such an increase in computational resources may not be needed or desirable, thereby adding unnecessary costs to a storage capacity expansion.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for capacity expansion using mixed-capacity storage devices in a CAS system will now be described in greater detail with reference to FIGS. 5 and 6. Although described in the context of system 100, these platforms may also be used to implement at least portions of other information processing systems in other embodiments.

Figure 5:
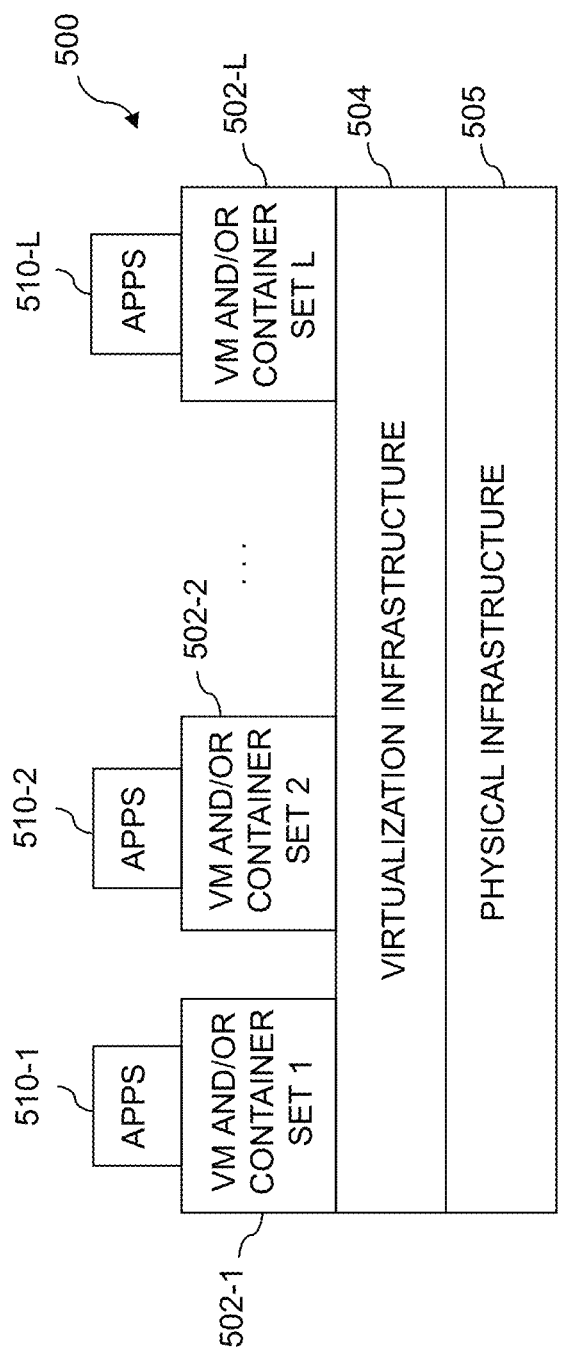

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for capacity expansion using mixed-capacity storage devices in a CAS system of the type described above using one or more processes running on a given one of the VMs. For example, each of the VMs can implement capacity expansion logic instances and/or other components for implementing functionality for capacity expansion using mixed-capacity storage devices in the CAS system 102.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for capacity expansion using mixed-capacity storage devices in a CAS system of the type described above. For example, a container host device supporting multiple containers of one or more container sets can implement one or more instances of capacity expansion logic and/or other components for implementing functionality for capacity expansion using mixed-capacity storage devices in the CAS system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for capacity expansion using mixed-capacity storage devices in a CAS system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, capacity expansion logic, parity computation logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage devices comprising a first set of storage devices each having a first capacity and a second set of storage devices each having a second capacity higher than the first capacity;
the storage system being configured:
to establish an extended redundant array of independent disks (RAID) group to extend existing RAID stripes of the storage devices of the first set into the storage devices of the second set; and
to establish an additional RAID group for the storage devices of the second set, the additional RAID group comprising one or more additional RAID stripes for the storage devices of the second set;
wherein an extended RAID stripe of the extended RAID group has a number of columns equal to a sum of the number of storage devices of the first set and the number of storage devices of the second set.

2. The apparatus of claim 1 wherein the storage devices of the second set are added to the storage system in order to increase its storage capacity beyond a previous storage capacity provided by the storage devices of the first set.

3. The apparatus of claim 1 wherein the existing RAID stripes of the storage devices of the first set are established by the storage system prior to addition of the storage devices of the second set into the storage system, the storage devices of the second set having been added into the storage system after the establishment of the existing RAID stripes of the first set in order to increase a storage capacity of the storage system relative to its storage capacity with only the storage devices of the first set.

4. The apparatus of claim 1 wherein the extended and additional RAID groups are part of a RAID arrangement that includes parity information supporting at least one recovery option for reconstructing data pages of at least one of the storage devices responsive to a failure of that storage device.

5. An apparatus comprising:
a storage system comprising a plurality of storage devices;
the storage devices comprising a first set of storage devices each having a first capacity and a second set of storage devices each having a second capacity higher than the first capacity;
wherein the storage system is implemented as a distributed storage system that comprises a plurality of storage nodes each having a processor coupled to a memory and each comprising a corresponding subset of the storage devices;
the storage system being configured:
to establish an extended redundant array of independent disks (RAID) group to extend existing RAID stripes of the storage devices of the first set into the storage devices of the second set; and
to establish an additional RAID group for the storage devices of the second set, the additional RAID group comprising one or more additional RAID stripes for the storage devices of the second set.

6. The apparatus of claim 5 wherein the extended and additional RAID groups are established for a particular one of the storage nodes of the distributed storage system wherein the particular storage node comprises the first and second sets of storage devices.

7. The apparatus of claim 5 wherein each of the storage nodes further comprises a set of processing modules configured to communicate over one or more networks with corresponding sets of processing modules on other ones of the storage nodes.

8. The apparatus of claim 7 wherein the sets of processing modules collectively implement at least a portion of a distributed storage controller of the distributed storage system.

9. The apparatus of claim 7 wherein the sets of processing modules of the storage nodes each comprise at least one data module and at least one control module.

10. The apparatus of claim 1 wherein an additional RAID stripe of the additional RAID group has a number of columns equal to the number of storage devices of the second set.

11. The apparatus of claim 1 wherein the extended and additional RAID groups are each configured in accordance with a RAID 6 arrangement supporting recovery from failure of up to two of the storage devices of the corresponding group.

12. An apparatus comprising:
a storage system comprising a plurality of storage devices;
the storage devices comprising a first set of storage devices each having a first capacity and a second set of storage devices each having a second capacity higher than the first capacity;
the storage system being configured:
to establish an extended redundant array of independent disks (RAID) group to extend existing RAID stripes of the storage devices of the first set into the storage devices of the second set; and
to establish an additional RAID group for the storage devices of the second set, the additional RAID group comprising one or more additional RAID stripes for the storage devices of the second set;
wherein data pages are stored across the storage devices of the extended and additional RAID groups using multiple RAID layers, wherein a size of a given one of the RAID layers is larger for the storage devices of the second set than it is for the storage devices of the first set.

13. The apparatus of claim 12 wherein an uppermost one of the RAID layers comprises at least one of a RAID 1 layer and a RAID 1-3 layer and a lowermost one of the RAID layers comprises a RAID 6 layer.

14. The apparatus of claim 1 wherein activation of the additional RAID group is performed responsive to a total number of the storage devices of the second set reaching a specified minimum threshold number of storage devices.

15. A method for use in a storage system comprising a plurality of storage devices, the storage devices comprising a first set of storage devices each having a first capacity and a second set of storage devices each having a second capacity higher than the first capacity, the method comprising:
establishing an extended redundant array of independent disks (RAID) group to extend existing RAID stripes of the storage devices of the first set into the storage devices of the second set; and
establishing an additional RAID group for the storage devices of the second set, the additional RAID group comprising one or more additional RAID stripes for the storage devices of the second set;
wherein an extended RAID stripe of the extended RAID group has a number of columns equal to a sum of the number of storage devices of the first set and the number of storage devices of the second set.

16. The method of claim 15 wherein the storage devices of the second set are added to the storage system in order to increase its storage capacity beyond a previous storage capacity provided by the storage devices of the first set.

17. The method of claim 15 wherein the existing RAID stripes of the storage devices of the first set are established by the storage system prior to addition of the storage devices of the second set into the storage system, the storage devices of the second set having been added into the storage system after the establishment of the existing RAID stripes of the first set in order to increase a storage capacity of the storage system relative to its storage capacity with only the storage devices of the first set.

18. A computer program product comprising a non-transitory processor-readable storage medium having stored therein program code of one or more software programs, wherein the program code when executed by a storage system comprising a plurality of storage devices, the storage devices comprising a first set of storage devices each having a first capacity and a second set of storage devices each having a second capacity higher than the first capacity, causes the storage system:
to establish an extended redundant array of independent disks (RAID) group to extend existing RAID stripes of the storage devices of the first set into the storage devices of the second set; and
to establish an additional RAID group for the storage devices of the second set, the additional RAID group comprising one or more additional RAID stripes for the storage devices of the second set;
wherein an extended RAID stripe of the extended RAID group has a number of columns equal to a sum of the number of storage devices of the first set and the number of storage devices of the second set.

19. The computer program product of claim 18 wherein the storage devices of the second set are added to the storage system in order to increase its storage capacity beyond a previous storage capacity provided by the storage devices of the first set.

20. The computer program product of claim 18 wherein the existing RAID stripes of the storage devices of the first set are established by the storage system prior to addition of the storage devices of the second set into the storage system, the storage devices of the second set having been added into the storage system after the establishment of the existing RAID stripes of the first set in order to increase a storage capacity of the storage system relative to its storage capacity with only the storage devices of the first set.

\* \* \* \* \*